Aug. 23, 1927.
W. E. WILLIAMS
1,640,063
AUTOMOBILE STEEL DISK WHEEL
Filed Aug. 22, 1922    2 Sheets-Sheet 1
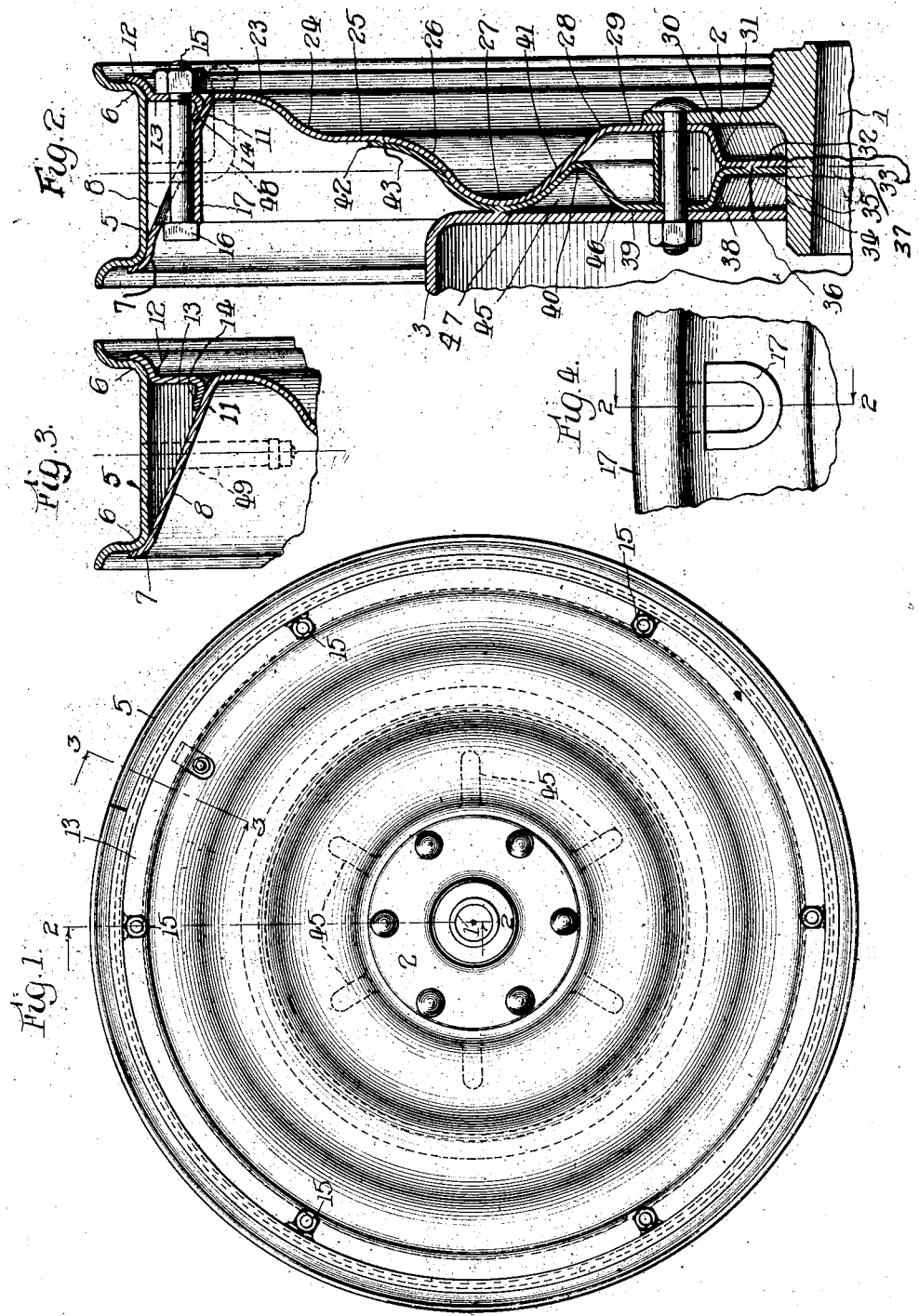

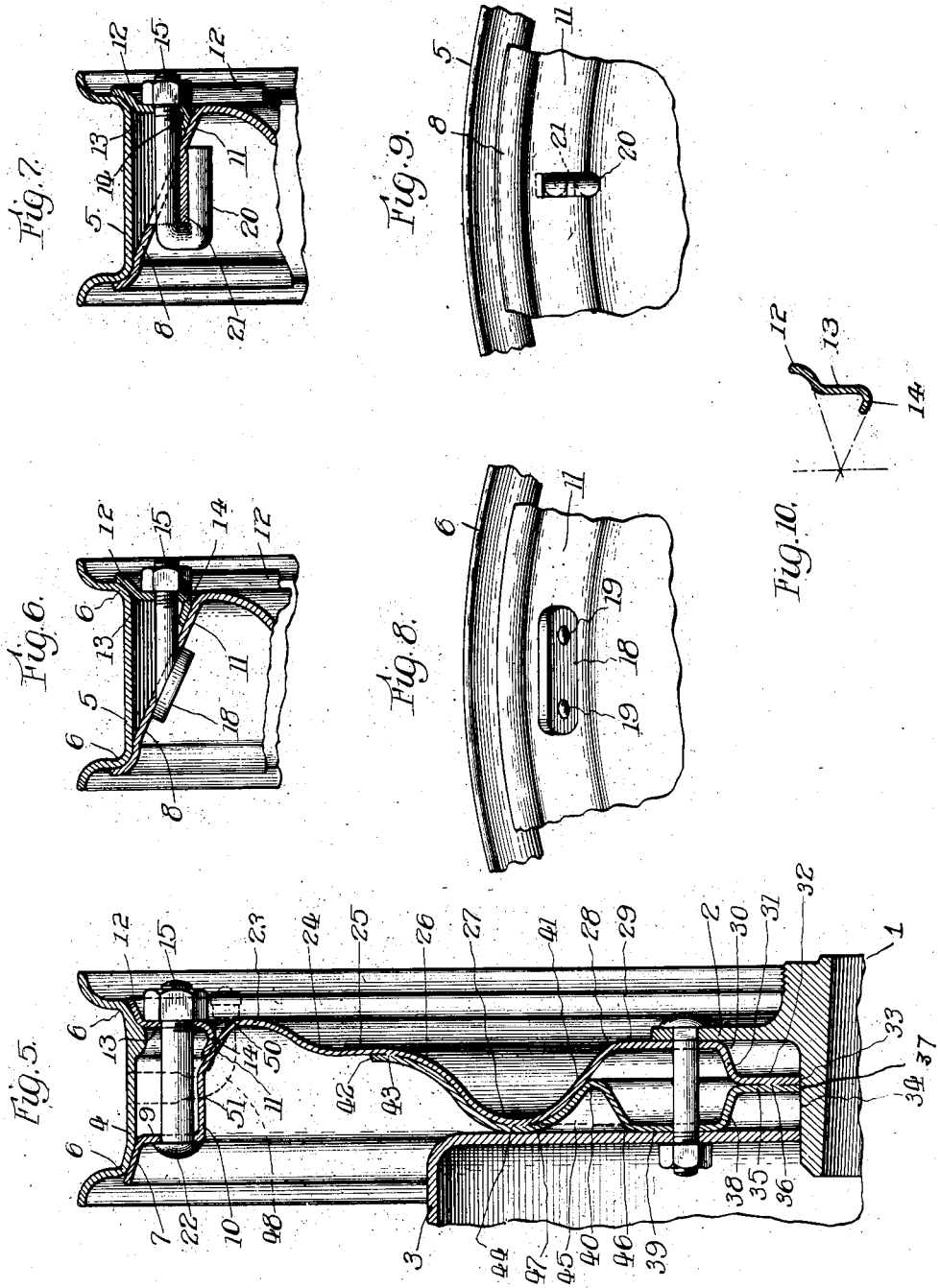

Patented Aug. 23, 1927.

1,640,063

UNITED STATES PATENT OFFICE.

WILLIAM ERASTUS WILLIAMS, OF CHICAGO, ILLINOIS, ASSIGNOR TO AMERICAN STEEL FOUNDRIES, OF CHICAGO, ILLINOIS, A CORPORATION OF NEW JERSEY.

AUTOMOBILE STEEL DISK WHEEL.

Application filed August 22, 1922. Serial No. 583,647.

My invention relates to that class of steel disk wheels on which are carried demountable rims for pneumatic tires, and the object of the invention is to furnish a simple, strong and efficient construction that will carry various types of easily mounted and demounted rims. Reference will be had to the accompanying drawings, in which Figure 1 is a front elevation of a rear wheel.

Figure 2 is a radial, axial section of the same wheel.

Figure 3 is a radial, axial section at one side of the bolt seen in Figure 2.

Figure 4 is an elevation of a portion of the rear face of the wheel.

Figure 5 shows a modified form of the tread flange and a wedge ring.

Figure 6 is a detail showing a different, flanged clamping bolt.

Figure 7 shows another form of clamping bolt for the wedge ring.

Figure 8 is a view of the device shown in Figure 6 seen from the rear face.

Figure 9 is a like view showing devices seen in Figure 7.

Figure 10 is a diagram of the lines of the wedge ring.

In the drawing, the hub 1 of the ordinary automobile wheel is here shown as the rear hub and is provided with an integral hub flange 2. The ordinary brake drum 3, in this case, functions as a removable flange for the hub.

In Figure 5, one type of a demountable split rim 4, is shown as being adapted for a straight side tire, while 5 indicates an ordinary standard split rim for straight side tires.

With my tread flange 7 and clamping wedge ring I am enabled to use the rim 4, or the rim 5, or any of several other varieties of rims, without changing the seats of the wedge ring or of the rim flange, for the points 6 being angles of the tire beads are substantially the same for all kinds of rims, as the tire sizes are standard at these points.

I prefer to make my wheel having a main front disk which extends from the hub and forms a rim flange 7, one margin of which furnishes a shoulder underneath the bearing point 6, of the rim, on the inside of the wheel. From the marginal portion 7, the flange is tapered outwardly as is indicated by 8 in all of the figures except Figure 5, and in Figure 5, instead of the inclined tread flange 8, I form a vertical offset 9, which merges into a suitable portion 10, and this merges into an inclined seat 11, for a wedge ring seat.

The inclined seat 11 is the same shape in all of the figures and the inclined flange 8 is a part thereof in all the figures except Figure 5.

The wedge ring which supports the front edge of the rim I prefer to make out of a section which is provided with the outer inclined bearing flange 12, merging into a plane vertical flange 13, terminating in an inclined flange 14, which bears on the seat 11.

This wedge ring is no more nor less than a wedge ring of the old type, so far as the bearing faces are concerned, for supporting the outer edge of the rim from the seat 11 of the disk, but the parts of the wedge not in active service are not necessarily used but may be eliminated in this section. See Figure 10 which shows in dotted lines the continuation of the wedging surfaces to produce a complete wedge showing the wedge character of the ring. I save metal by eliminating the parts of the wedge not needed and thus obtain a section such as described.

I make this ring wide enough in its vertical portion 13, to allow perforating for clamping bolts 15, which clamp the wedge in place directly without the intermediate use of wedge clips heretofore used.

By means of the tread flange on my main disk and this wedge ring I secure a felloe-like portion of a wheel. My wedge ring makes a full clear front-closed face for what might be termed the front side of a channel shaped steel felloe.

In Figures 2 and 5, the bolts 15 are straight bolts, and in Figure 2 are provided with square heads 16. To accommodate the use of the straight bolts 15 as in Figure 2, I shear and depress the flange 8 of the disk to form small pockets 17 for the bolts 15, the heads of which rest against the end face of this depressed portion 17.

In place of depressing this portion 17 to use a straight bolt 15 with its head 16, the bolt may be given a peculiar head 18, Figures 6 and 8, which is riveted at 19 to the flange 8, or the bolt may be headless and lie in a depressed portion 21, similar to 17. I may bend the bolt back at 20, Figures 7 and 9, firmly engaging the depressed portion 21.

In place of using the depressions 17 and 21 of the flange 8, I sometimes offset the tread, without shearing to form a plane vertical portion 9, Figure 5, which is perforated for the bolts having any suitable heads 22, and thus make unnecessary the separate operation of pressing the depressions 17 and 21 as previously described.

The inclined bearing surface 11 of the main front disk, merges into the zone 23 and this in turn into the inward curved zone 24, which is continuous with the plane zone 25, curved zone 26, the concave zone 27, conical zone 41, turning at 28 into the vertical zone 29, which fits the inside of the flange 2, or the normal surface occupied by the wooden spokes of an artillery wheel. From the zone 29 the disk is curved at 30 into the inclined zone 31, and it is oppositely turned over into the vertical portion 32 which is bored out at 33 for the standard shape 34 of hub barrel used with an ordinary artillery wheel.

The main front disk is reinforced by a secondary disk which at 35 joins the main disk portion 32, and is spot welded or riveted to the main disk at 36, and is bored out at 37 in the same manner as the main disk was bored at 33 to fit the hub.

The reinforcing disk is curved outward at 38 to merge into the vertical portion 39 which forms the rear face or the surface that corresponds to the inside of the wooden spokes of an artillery wheel. The portion 39 is bent outward at 46 and at 40 fits against the main disk portion 41, and forms to aid in resisting both skid and vertical load shocks. From this point 40 the reinforcing disk follows the surface of the main disk and terminates at 42, being spot welded thereto at 43 and 44 or joined by other suitable means making it a unitary part of the main disk.

Small corrugations 45 extend, in the reinforcing disk, from the points 46 to the points 47 stiffening the reinforcing disk between these points. These corrugations occur only at intervals around the hub, as is indicated in Figure 1.

I prefer to use with my wheel what is known as an angle valve which is indicated by 48 in dotted lines, but I may use a straight ordinary valve stem 49 as shown in dotted lines in Figure 3 which passes through an aperture in the flange of this section of the wheel.

What I claim is:—

1. In a disk wheel, the combination of a disk having its tread portion bent laterally at a distance from its outer margin to extend obliquely towards the rear across the plane of the wheel and provided at its margin with a rim-seating flange, a clamping member having its inner margin bearing upon the oblique surface and extending radially outward and terminating at the outer margin in a rim-seating flange, a tire-rim resting on the two flanges, the oblique tread portion being provided at circumferentially spaced intervals with bolt anchoring portions substantially perpendicular to the wheel plane, and bolts connecting the said bolt-anchoring portions of the tread and the clamping member for forcing the latter along the incline to exert oppositely directed stress upon the rim and disk.

2. In a disk wheel, the combination of a disk having its tread portion bent laterally at a distance from its outer margin to extend obliquely towards the rear across the plane of the wheel and providing at its margin a rim seat, a clamping ring having its inner margin bearing upon the oblique surface and extending radially outward and terminating at the outer margin in a rim seat, a tire-rim resting on the two seats, the oblique portion of the wheel tread interrupted at intervals by portions depressed into substantially parallel relation to the wheel axis and presenting substantially perpendicular rear faces, and bolts lying in the depressed portions with their heads interlocked with the rear faces thereof and with their threaded ends projecting through holes in the clamping ring, and nuts engaging the bolts and bearing on the forward face of the ring whereby to force the ring along the incline to exert oppositely directed stress upon the rim and disk.

In testimony whereof I hereunto affix my signature.

WILLIAM ERASTUS WILLIAMS.

CERTIFICATE OF CORRECTION.

Patent No. 1,640,063.  Granted August 23, 1927, to

WILLIAM ERASTUS WILLIAMS.

It is hereby certified that the above numbered patent was erroneously issued to "American Steel Foundries, of Chicago, Illinois," a corporation of New Jersey, whereas said patent should have been issued to "Steel Wheel Corporation, of Lansing, Michigan," a corporation of Michigan, said corporation being assignee, by mesne assignments, of the entire interest in said invention, as shown by the records of assignments in this office; and that the said Letters Patent should be read with this correction therein that the same may conform to the record of the case in the Patent Office.

Signed and sealed this 18th day of October, A. D. 1927.

Seal.

M. J. Moore,
Acting Commissioner of Patents.